Aug. 12, 1969    M. ANDERES    3,460,414
CONTROL LINKAGE FOR A FEED DRIVE OF A LATHE
Filed April 3, 1967    3 Sheets-Sheet 1

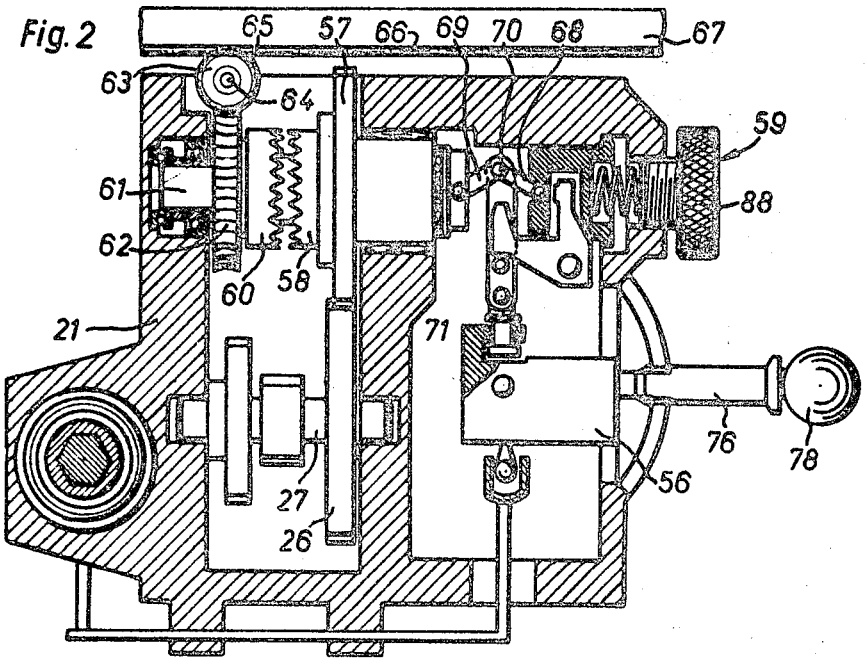
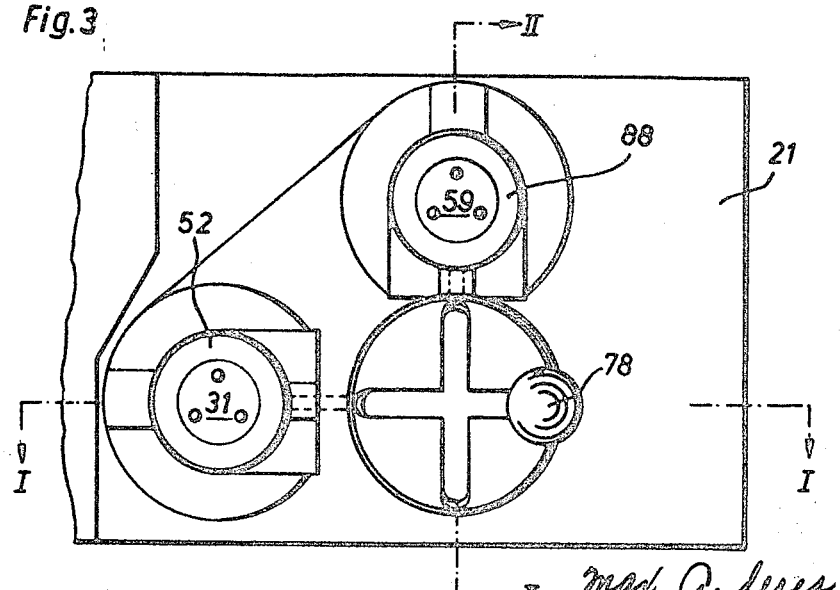

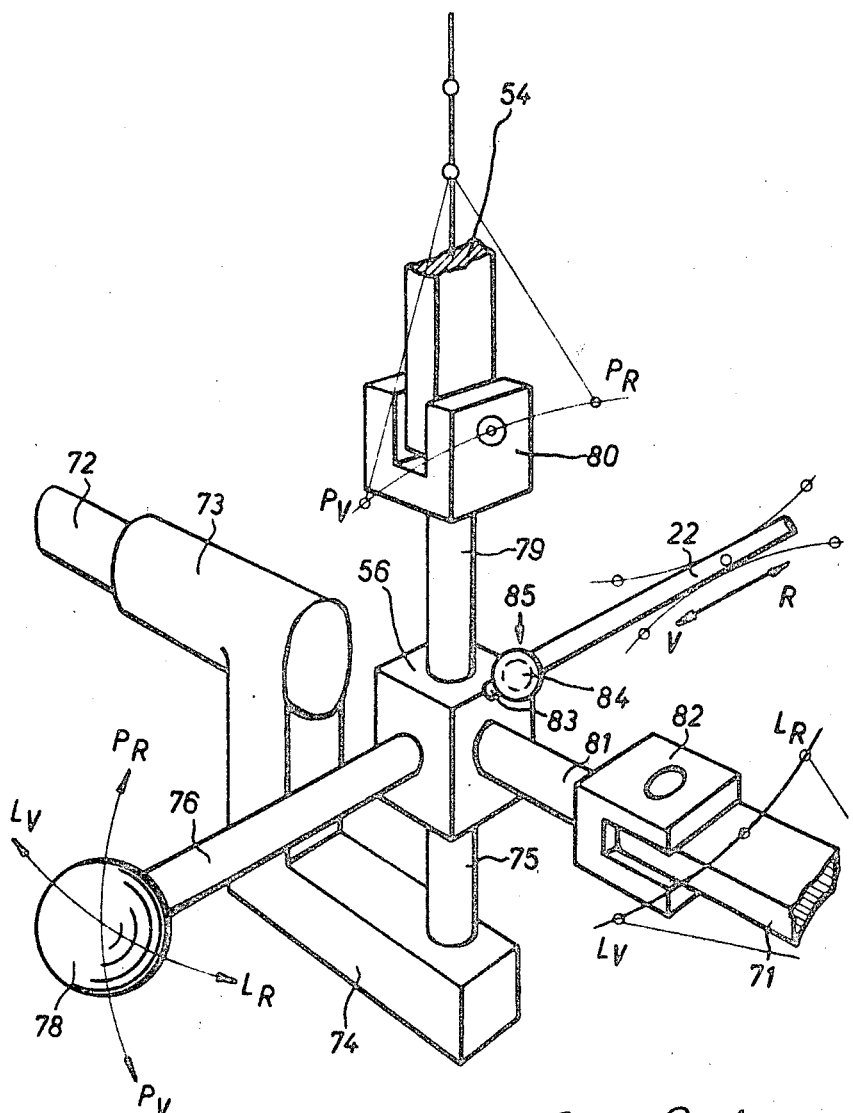

United States Patent Office 3,460,414
Patented Aug. 12, 1969

3,460,414
CONTROL LINKAGE FOR A FEED DRIVE OF A LATHE
Max Anderes, Baar, Switzerland, assignor to Oerlikon-Buhrle Holding Ltd., Zurich, Switzerland
Filed Apr. 3, 1967, Ser. No. 627,775
Claims priority, application Switzerland, Apr. 15, 1966, 5,508/66
Int. Cl. B23b 21/00
U.S. Cl. 82—22          5 Claims

ABSTRACT OF THE DISCLOSURE

A control arrangement is provided for the feed drive of a lathe equipped with longitudinal and cross slides which comprises a first clutch for the longitudinal slide and a second clutch for the cross slide, as well as a reversing gear for reversing the direction of rotation of a common drive shaft for the feed of the longitudinal slide and cross slide. Each clutch and the reversing gear can be actuated selectively by means of a single hand lever so that the longitudinal slide or the cross slide travels forwardly or backwardly.

---

The invention relates to a control linkage for the feed drive of a lathe.

The object of the invention is to provide a control linkage whereby both the cross slide and the longitudinal slide can be displaced selectively forwards or backwards by means of a single common control lever.

A further object of the invention is to provide a control linkage which comprises overload clutches, one for the cross slide, and one for the longitudinal slide, which can each be set, independently of one another, to a specific value at which the overload clutch is disengaged automatically.

A further object is to provide a lathe equipped with a drive shaft, two driven shafts for actuating said slides, means for reversing the drive from said drive shaft to said driven shafts, a first and a second clutch cooperating with said driven shafts, a pivotal control member for said clutches and reversing means, guides for said control member whereby said member may be pivoted from an initial position into four control positions, a first and second control rod having longitudinal axes perpendicular to one another in the initial position connecting said control member to said two clutches, a hand lever connected to said control member to pivot said control member about the longitudinal axis of said first control rod into the first or second of said control positions and actuate said second control rod to engage said second clutch, and to pivot said control member about the longitudinal axis of said second control rod into the third or fourth of said control positions and actuate said first control rod to engage said first clutch so that the rotation of said drive shaft can be transmitted selectively to one or the other of said driven shafts, a third control rod connecting said control member to said reversing means, said reversing means being connected to said control member spaced from said two control rods whereby in the first and third control positions of said control member said driven shafts rotate in one direction and in the second and fourth control positions of said control member said driven shafts rotate in the other direction.

With the above and other objects in view which will become apparent from the detailed description below, a preferred form of the invention is shown in the drawings in which:

FIGURE 2 shows a partial vertical section on section line II—II of FIGURE 3 through the apron illustrated in FIGURE 1;

FIGURE 3 is a front view of the apron illustrated in FIGURES 1 and 2, and

FIGURE 4 is a perspective illustration of a part of the apron shown in FIGURES 1 to 3.

Figure 1:
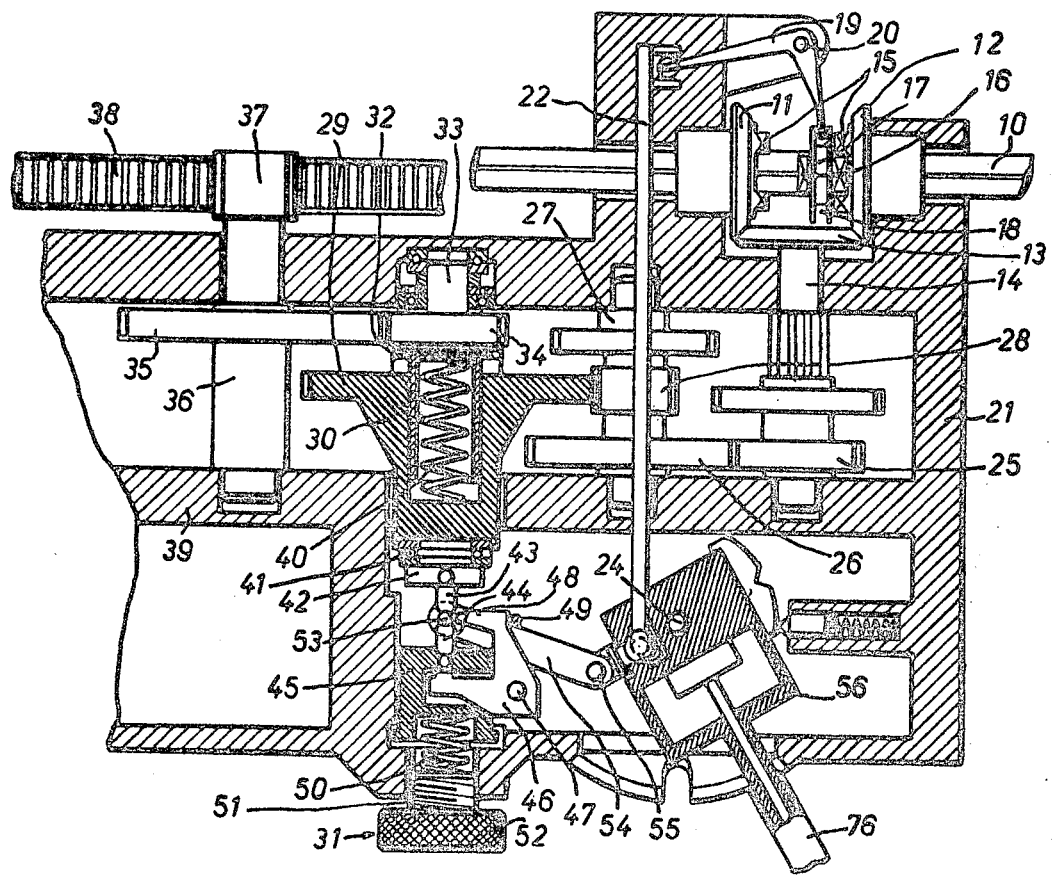
FIGURE 1 shows a partial vertical section on section line I—I of FIGURE 3 through an apron of a lathe.

According to FIGURE 1, a shaft 10, which is hexagonal in cross-section and on which there are mounted two bevel wheels 11 and 12, is provided for the apron. These bevel wheels 11 and 12 are in mesh with a further bevel wheel 13 which is keyed on to a shaft 14 mounted perpendicular to the drive shaft 10. The two bevel wheels 11 and 12 mounted for rotation on the shaft 10 have, at their opposing faces, a number of dogs 15 which can be brought into engagement with a dog 16 of a clutch member 17.

The clutch member 17 is mounted for displacement but held against rotation on the shaft 10 and comprises a groove 18 in which one arm of a two-armed lever 19 engages. This two-armed lever 19 is mounted for pivoting about an axis 20 in the housing 21 of the apron. The other arm of the two-armed lever 19 is articulated to a control rod 22 which is articulated, at its other end, to a control member 56. The control member 56 is pivotable about two shafts 72, 75 (FIGURE 4), as a result of which the control rod 22 is displaceable in its longitudinal direction and the two-armed lever 19 is pivoted about the axis 20 so that the clutch member 18 comes into engagement with one or the other of the bevel wheels 11 or 12.

A spur gearwheel 25, which is in mesh with a second spur gearwheel 26, is mounted and held against rotation but is axially displaceable on the shaft 14. The spur gearwheel 26 is keyed to a shaft 27 mounted parallel to the shaft 14 in the apron. A pinion 28 which is in mesh with a spur gearwheel 29 is further keyed to shaft 27. The spur gearwheel 29 is integral with a first clutch member 30 of an overload clutch 31 for the longitudinal feed. So-called Hirth-type teeth are provided at the end face of the clutch member 29 and are in mesh with corresponding teeth on a second clutch member 32 of the overload clutch 31. This second clutch member 32 is integral with a shaft 33 of the overload clutch 31.

A pinion 34, which is in mesh with a gearwheel 35, is keyed to the shaft 33. The gearwheel 35 is mounted and held against rotation, on a shaft 36, to which a pinion 37 is further secured which is in mesh with a rack 38. The rack 38 is secured to the frame, not illustrated, of the lathe on which the apron is mounted for displacement. The displacement of the apron is effected through the drive of the hexagonal shaft 10 which, through the gearwheels described, 11 or 12, 13; 25, 26; 28, 29 and 34, 35, drives the pinion 37 in mesh with the stationary rack 38, as a result of which the apron is displaced in relation to the rack 38 and hence in relation to the frame of the lathe.

If the apron runs against a stop, not illustrated, or if the resistance to the feed of the apron exceeds a given adjustable value for any reason, the above-mentioned overload clutch 31 is disengaged. In the first clutch member 30, which is mounted for rotation and displacement in the wall 39 of the housing 21, the tubular lower portion of the shaft 33 is likewise mounted for rotation and axial displacement. A spring 40, which bears on the one hand against a second clutch member 32 and on the other hand against the first clutch member 30, tends to bring the two clutch members 30 and 32 out of engagement. The axially displaceable clutch member 30 bears against a non-rotating pin 42, through a ball bearing 41.

Articulated to this pin 42 is a toggle joint which consists of two levers 43, 44 and which bears against a sliding member 45, a bell-crank lever 46 is mounted for pivoting about a fixed pin 47 and comprises a stop 48 which prevents the toggle joint 43, 44 from bending sharply towards the right. The pivotability of the bell-crank lever 46 in clockwise direction is limited by a stop 49. A spring 50, which bears on the one hand against the sliding member 45 and on the other hand against an adjustable screw 51, tends to pivot the bell-crank lever 46 in clockwise direction and to urge it against the stop 49.

The screw 51 is rotatable by means of an adjusting knob 52 by means of which the initial tension of the spring 50 can be adjusted. A thread is provided for the displacement of the screw 51 so that the screw 51 is displaced axially on rotation of the adjusting knob 52. Articulated to the point of articulation 53 between the two levers 43 and 44 of the toggle joint, is a rod 54 which in turn is articulated to a control member 56 through a pin 55. This control member 56 is described below.

According to FIGURE 2, the spur gearwheel 26, mentioned above, which is keyed to the shaft 27 and driven by the gearwheel 25, is in mesh with a further gearwheel 57 which is secured to a first clutch member 58 of a second overload clutch 59 for the feed of the cross slide. This second overload clutch 59 is constructed in precisely the same manner as the first overload clutch 31 described above for the longitudinal feed. The description of this second overload clutch can therefore be less detailed. A second clutch member 60, which is likewise in mesh with the first clutch member 58 through so-called Hirth-type teeth, is keyed to a shaft 61 and rigidly connected to a wormwheel 62. This wormwheel 62 is in mesh with a worm 63 which is mounted on a shaft 64 on which there is keyed a gearwheel 65. The shaft 64 is mounted in the housing 21. The gearwheel 65 is in mesh with a rack 66 of a cross slide 67 which is illustrated in greatly simplified form in the drawing.

This second overload clutch 59 likewise has a toggle joint, consisting of the two levers 68 and 69. Articulated to the point of articulation 70 between the two levers 68 and 69 is a rod 71 which in turn is articulated to the same control member 56 as the link 54 of the first overload clutch 31. The second overload clutch 59 can therefore be engaged and disengaged with the same control member 56 as the first overload clutch 31.

According to FIGURE 4, a sleeve 73, which is integral with an angle lever 74, is mounted on a shaft 72 secured in the housing 21. A shaft 75, disposed vertically, is mounted for rotation on this angle lever 74, on the arm illustrated horizontally in the figure. The bearing arrangement for this shaft 75 on the angle lever 74 is not illustrated in the drawing for the sake of simplicity.

The cubical control member 56 is secured to shaft 75. On this control member 56 there are a control lever 76 with a control knob 78, a first fork 80 which is mounted for rotation on a shaft 79, and a second fork 82 which is mounted for rotation on a shaft 81. Between these two forks 80 and 82 there is provided a rod 83 which is inclined at 45° to the two shafts 79 and 81 and which is in the same plane as the two shafts 79 and 81. As can be seen from FIGURE 4, the two shafts 72 and 81 lie on one axis. The two shafts 75 and 79 likewise lie on one axis. The two links 54 and 71 are articulated to the two forks 80 and 82. A ball 84, which forms part of a ball-and-socket joint 85, which connects the rod 83 to the rod 22, is secured to the rod 83.

The operation of the device described is as follows: Both the drive of the cross slide and the drive of the longitudinal slide 67 are effected in known manner through the so-called feed rod which, in the present example, is the hexagonal shaft 10. This hexagonal shaft 10 is driven in known manner from the gear-box, not illustrated, of the machine tool, and drives the bevel wheel 13 secured to the shaft 14 through the two bevel wheels 11 or 12. During the longitudinal feed, the shaft 14 drives the shaft 27 through the gearwheels 25, 26, and the pinion 28 drives the gearwheel 29. The gearwheel 29 transmits a torque through the two clutch members 30, 32 of the first overload clutch 31 to the pinion 34. The pinion 34 drives the pinion 37 through gearwheel 35 and shaft 36 as a result of which the apron is displaced in relation to the rack 38.

During the feed of the cross slide, the drive is likewise effected through the gearwheels 11 or 12, the bevel wheel 13, the shaft 14 and the gearwheels 25 and 26. The gearwheel 26 drives the gearwheel 57 secured to the first clutch member 58 of the overload clutch 59. This gearwheel 57 transmits a torque through the two clutch members 58, 60 of the second overload clutch 59 to the worm wheel 62 which drives the cross slide 67 through the worm 63, the gearwheel 65 and the rack 66. The maximum permissible torque can be varied at this clutch 59 in the same manner as with the first overload clutch 31, by means of the adjusting knob 88 according to the particular requirements.

If the torque which has to be transmitted from the first clutch member 30 to the second clutch member 32 exceeds a specific value, which can be set, then a component of force arises which tends to bring the two clutch members 30, 32 out of engagement with one another. This component of force is transmitted, through the toggle joint 43, 44 and through the sliding member 45, to the spring 50 and causes a compression of the spring 50. On compression of the spring 50, the bell-crank lever 46 is pivoted in counter-clockwise direction and the stop 48 of the bell-crank lever 46, against which the toggle joint 43, 44 bears, causes the toggle joint to break sharply. As a result of the sharp breaking of the toggle joint 43, 44, the two springs 40 and 50 can relax while the two clutch members come out of engagement and as a result of which the engagement is interrupted and the apron comes to a standstill.

The magnitude of the torque transmitted by the overload clutch can be determined by means of the setting knob 52. By turning the setting knob 52, the initial tension of the spring 50 can be increased or reduced so that a greater or smaller component of force is necessary in order to pivot the bell-crank lever in counter-clockwise direction so that the toggle joint 43, 44 is broken sharply. Since the torque which can be transmitted by the overload clutch is always proportional to the component of force which is necessary to break the toggle joint 43, 44 sharply, the torque which can be transmitted also varies when the initial tension of the spring 50 is varied.

As can be seen from FIGURES 1, 2 and 4, the two overload clutches 31 and 59 are disengaged when the control member 56 is in the mid position illustrated in FIGURE 4. If the control member 56 is pivoted about the axis 72, the control lever 76 being brought into the positions designated by $P_V$ and $P_R$, the toggle joint 68, 69 is straight and the overload clutch 59 of the cross slide 67 is engaged.

If the control member 56 is pivoted about the axis 75, the control lever 76 being brought into the positions designed by $L_V$ and $L_R$, the toggle joint 43, 44 is straight and the overload clutch 31 of the longitudinal slide is engaged. If the control member 56 is pivoted about the axes 72 or 75, the control lever 76 being brought into the positions designated by $L_R$ or $P_R$, the rod 22 is displaced in the direction of the arrow R in FIGURE 4 and the bevel wheel 11 is coupled to the hexagonal shaft 10 through the bell-crank lever 19. If the control member 56 is pivoted about the axes 72 or 75, the control lever 76 being brought into the positions designated by $L_V$ or $P_V$, the rod 22 is displaced in the direction of the arrow V in FIGURE 4 and the bevel wheel 12 is coupled to the hexagonal shaft 10 by the bell-crank lever 19.

I claim:
1. A lathe having a longitudinal and a cross slide comprising a drive shaft, two driven shafts for actuating said slides, means for reversing the drive from said drive shaft to said driven shafts, a first and a second clutch co- operating with said driven shafts, a pivotal control member for said clutches and reversing means, guides for said control member whereby said member may be pivoted from an initial position into four control positions, a first and second control rod having longitudinal axes perpendicular to one another in the initial position connecting said control member to said two clutches, a hand lever connected to said control member to pivot said control member about the longitudinal axis of said first control rod into the first or second of said control positions and actuate said second control rod to engage said second clutch and to pivot said control member about the longitudinal axis of said second control rod into the third or forth of said control positions and actuate said first control rod to engage said first clutch so that the rotation of said drive shaft can be transmitted selectively to one or the other of said driven shafts, a third control rod connecting said control member to said reversing means, said reversing means being connected to said control member spaced apart from said two control rods whereby in the first and third control positions of said control member said driven shafts rotate in one direction and in the second and fourth control positions of said control member said driven shafts rotate in the other direction.

2. A lathe as set forth in claim 1 comprising a stationary first pin, a crank arm mounted on said first pin, a second pin mounted perpendicular to said first pin on said crank arm, and said control member being mounted on said second pin.

3. A lathe as claimed in claim 1, wherein said cross slide is displaceable by said drive shaft by said first clutch and a driven shaft and said longitudinal slide displaceable by said drive shaft by said second clutch and the other driven shaft.

4. A lathe as claimed in claim 1, wherein said guides are formed by two intersecting slots in which said hand lever is guided and which is in the initial position at the point of intersection of said slots while at the ends of one slot it is in the first and second control positions and at the ends of the other slot in the third and fourth control position.

5. A lathe as claimed in claim 1, wherein each of said clutches is provided with a toggle joint which is straight when the clutch is engaged and broken when the clutch is disengaged and each of said toggle joints being connected to one of said control rods.

References Cited

UNITED STATES PATENTS 2,305,792   12/1942   Mobius et al. _____ 82—22

FOREIGN PATENTS 1,171,237   3/1964   Germany.

LEONIDAS VLACHOS, Primary Examiner